United States Patent [19]

Cheng et al.

[11] Patent Number: 4,745,015
[45] Date of Patent: May 17, 1988

[54] THERMAL INSULATING PANEL

[75] Inventors: Chin H. Cheng, Midland; Wilhelm E. Walles, Freeland, both of Mich.

[73] Assignee: The Dow Chemical Company, Midland, Mich.

[21] Appl. No.: 485,699

[22] Filed: Apr. 18, 1983

Related U.S. Application Data

[63] Continuation-in-part of Ser. No. 307,349, Sep. 30, 1981, abandoned.

[51] Int. Cl.⁴ .................... B32B 1/06; B32B 3/02
[52] U.S. Cl. ................................. 428/35; 105/357; 220/83; 220/421; 220/469; 428/75; 428/76; 428/332; 428/461; 428/920
[58] Field of Search .............. 428/69, 75, 76, 35, 428/461, 920; 105/357; 55/387; 220/1, 1.5, 87, 420, 461, 469, 467, 423, 450

[56] References Cited

U.S. PATENT DOCUMENTS

| | | | |
|---|---|---|---|
| 2,164,143 | 6/1939 | Munters . | |
| 2,643,021 | 6/1953 | Freedman | 220/9 |
| 3,179,549 | 4/1965 | Strong et al. | 161/43 |
| 3,225,954 | 12/1965 | Herrick et al. | 220/9 |
| 3,295,709 | 1/1967 | Herrick et al. | 220/9 |
| 3,480,464 | 11/1969 | Lacy | 117/71 |
| 3,916,048 | 10/1975 | Walles | 428/35 |
| 3,993,811 | 11/1976 | Walles | 428/35 |
| 4,313,996 | 2/1982 | Newman et al. | 428/215 |

Primary Examiner—Paul J. Thibodeau

[57] ABSTRACT

An improved vacuum panel of double wall construction comprising:

(a) two walls of a structurally stable material containing at least one metal layer of at least 0.125 mm in thickness;

(b) edges of a normally solid plastic material which have been rendered substantially impermeable to gases, said edges being affixed by means of an adhesive layer to the walls such that an evacuated space is enclosed between the walls of the panel, and (c) a gas-absorbing material residing in the evacuated space.

13 Claims, 1 Drawing Sheet

U.S. Patent   May 17, 1988   4,745,015
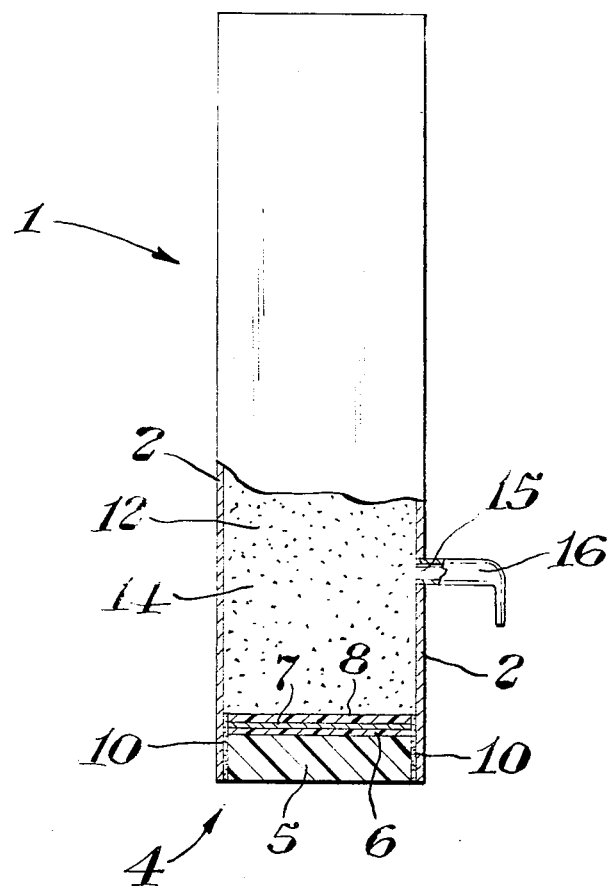

THERMAL INSULATING PANEL

CROSS-REFERENCE TO RELATED APPLICATIONS

This application is a continuation-in-part of application Ser. No. 307,349, filed Sept. 30, 1981, now abandoned.

BACKGROUND OF THE INVENTION

This invention relates to panels having double wall construction with an evacuated space enclosed between the walls, useful as thermal insulating panels for refrigerators, picnic coolers, freezers, refrigerated trucks and the like.

Foamed plastic panels are currently widely employed as insulating panels in refrigerators, refrigerated trucks, picnic coolers and the like. However, the thermal conductivity of said foamed plastic panels is approximately three to six times as great as that of a vacuum panel. Therefore, in a given time, up to six times as much heat is lost through a foamed plastic panel as is lost through a vacuum insulating panel of like dimensions. Moreover, the insulating properties of foamed plastic panels often deteriorate with time.

Therefore, it would be highly desirable to provide an economical vacuum insulating panel. In U.S. Pat. No. 3,179,549 to Strong et al. such a vacuum insulating panel is disclosed. Said panel, however, is of all metal construction, and due, to the high thermal conductivity of metal, significant heat is lost through the edges of the panel. U.S. Pat. No. 3,993,811 to Walles discloses a plastic vacuum panel, the walls and edges of which are rendered substantially impermeable to gases by depositing thereon a layer of metal and a layer of a barrier polymer. While this plastic panel does not lose significant amounts of heat through its edges, pinholes or other imperfections in the metal layer may permit gases to permeate the walls of the panel at a rate such that the useful life of the panel is less than desired for some applications.

In view of the deficiencies of known vacuum thermal insulating panels, it would be highly desirable to provide a vacuum panel having improved thermal insulating properties and a prolonged useful life.

SUMMARY OF THE INVENTION

The present invention is such an improved vacuum panel. In the present invention, a vacuum panel having improved thermal insulating properties and an increased useful life comprises two walls of a structurally stable metal-containing material having at least one metal layer of at least 0.125 mm thickness, edges of a solid plastic material which has been rendered substantially impermeable to gases by depositing thereon one or more metal layers and/or layers of a barrier polymer, said edges being affixed by means of an adhesive layer to the walls. The panels of this invention exhibit a permeance to oxygen and other gases of the atmosphere of less than 0.1 cc/day/m²/atm, an evacuated space enclosed within the panel and a gas-absorbing material residing within the evacuated space.

It is found that the panels which are the subject of the present invention are superior to previous vacuum panels in retaining for long periods sufficient vacuum to function adequately as a thermal insulating panel, while also losing reduced amounts of heat by thermal conduction through the edges of the panel. Moreover, these relatively thin vacuum panels provide barrier to heat loss which is significantly greater than that of conventional foam panels.

BRIEF DESCRIPTION OF THE DRAWING

The drawing is an elevational view, partially in section, of a preferred panel of the invention.

DETAILED DESCRIPTION OF THE INVENTION

In the drawing, there is depicted a preferred panel 1 having metal walls 2 and plastic edges 4. Plastic edge 4 comprises a plastic substrate 5, which is coated with a layer of a barrier polymer 6, over which a silver layer 7 is deposited, which in turn is overcoated with a layer of the barrier polymer 8. For purposes of illustration, the thickness of plastic edge 4 and the relative thicknesses of the plastic substrate 5 and layers 6, 7 and 8 are exaggerated in the drawing. Plastic edge 4 is affixed to the metal walls 2 with adhesive 10. Occupying at least a portion, and preferably all, of space 12 is a gas-absorbing solid particulate 14 for capturing gases present in space 12 as a result of incomplete evacuation of space 12, outgassing of the plastic edge 4 and gas which permeates the walls 2 or edge 4. An opening 15 is provided in metal wall 2 through which space 12 is evacuated. Opening 15 is fitted with an outlet 16, which is hermetically sealed after the evacuation of space 12.

For the purposes of this invention, the term "walls" means those two sides of the vacuum panel which are transverse to the direction of heat flow through the panel. Said "walls," in most applications, are those sides of the panel having greatest surface area. The term "edges," when used herein, means those sides of the panel which are approximately parallel to the direction of heat flow through the panel.

The panel walls comprise a structurally stable metal-containing material which is impermeable to gases and has sufficient mechanical strength to withstand deformation and puncture under normal conditions of use. The term "structurally stable metal-containing material," as used herein, means sheets of one or more metals or metal alloys, and layered materials including structural laminated materials having at least one continuous metal layer of at least 125 μm in thickness. Metal sheets suitably employed as the structurally stable metal-containing material comprise aluminum, aluminum alloys, alloy-clad aluminum, copper, bronze, magnesium or magnesium alloys, steel, tin-plate steel, aluminized steel, stainless steel, terne-plate steel, galvanized steel, chrome or chrome-treated steel and like metals or metal alloys which impart mechanical strength to the panel and are impermeable to gases. Due to cost and engineering considerations, said walls are preferably steel, aluminum or aluminum alloy, although for particular applications of the present invention, other materials may be preferred.

Structural laminated materials having a continuous metal layer of at least about 0.125 mm thickness, may be suitably employed as the metal-containing material. Said laminated materials include metal-metal laminates, metal-glass laminates and metal-plastic laminates. Especially preferred laminated materials are those metal-plastic-metal laminates described in the pending U.S. application Ser. No. 041,441, filed May 21, 1979, now U.S. Pat. No. 4,313,996.

The panel walls have a thickness of about 0.125 to 1.25 mm, preferably about 0.25 to 0.75 mm. It is understood that the wall thickness is suitable if it provides the container made thereof with sufficient strength to withstand deformation and puncture under normal conditions of use.

Plastic materials beneficially employed in the panel edges are those normally solid organic polymers which can be readily molded or shaped into the desired shapes and which retain their shapes under the conditions to which they will be exposed. Plastic materials suitable for use in the edges are those normally solid, organic polymers that are readily shaped or molded or otherwise fabricated into the desired container form and possess sufficient rigidity to retain said form under conditions to which they will be exposed. Preferably, the polymers are thermoplastic and are relatively inert to the gas-absorbing materials which are to be contained. Because of their lower cost and superior structural properties, polymers used in structural applications, so-called engineering plastics, such as polystyrene, styrene/acrylonitrile copolymers, styrene/butadiene copolymers, styrene/butadiene/acrylonitrile terpolymers, rubber-modified styrene polymers and other polymers of monovinylidene aromatic carbocylic monomers are generally preferred. Other polymers which may be suitably employed are acetal plastics such as polyformaldehyde resin, polyolefins such as polypropylene and polyethylene, polycarbonates, polyamides such as nylon, rigid polyvinyl chloride, polyesters such as poly(ethylene terephthalate), acrylic resins such as poly(methyl methacrylate) and other normally solid polymers which can be formed into the desired shape by conventional forming techniques, e.g., blow molding and injection molding. In addition to the foregoing polymers, the edges may also contain one or more additaments such as fillers, stabilizers, surface modifiers, gas-absorbing materials, dyes and the like.

Because injection molding or similar procedures are preferred in fabricating the edges, the plastic materials are preferably thermoplastic. However, thermosetting polymers can also be used. As a general rule, synthetic polymers, whether thermoplastic or thermosetting, are incapable of retaining a high vacuum for an extended period. Accordingly, plastic materials usually employed in the edges exhibit a degree of permeability to gases of the atmosphere such that a vacuum of $10^{-1}$ mm Hg cannot be maintained in containers fabricated solely of such plastic materials for more than about ten years.

The thickness of the plastic edges is chosen so that the panel made therewith has sufficient strength to withstand deformation and puncture under normal conditions of use. Plastic edges having a thickness of about 0.125 to 3.75 mm, preferably from about 0.25 to 2.5 mm, are suitably employed in the practice of this invention.

The plastic edges of the panel are essentially impermeable to gases. In a preferred embodiment of this invention, the plastic edges of the panel are rendered essentially impermeable to gases by depositing thereupon a metal layer which imparts barrier characteristics to the plastic edge. Metallization is carried out by depositing a coating of a metal such as silver, nickel, lead, aluminum, copper, gold, tin, bismuth, antimony, chromium, manganese and the like, including alloys thereof, by known techniques such as thermal evaporation, chemical vapor deposition, cathodic sputtering, electroplating or electroless plating techniques. Electroless plating techniques such as are described by F. A. Lowenheim in *Metal Coating of Plastics,* Noyes Data Corporation (1970) are preferably employed. Preferably, silver, nickel or alloys thereof are employed.

Because the metal layer significantly increases the thermal conductivity of the plastic edge upon which it is deposited, the metal layer is from about 0.005 to 5 $\mu$m in thickness. Preferably, the metal layer is about 0.025 to 0.2 $\mu$m thick. The metal layer is extensive enough that the surfaces of the plastic edge requiring the metal layer are at least 95 percent, preferably at least 99 percent, covered by metal.

More preferably, the metal layer is further coated with a layer of a barrier polymer such as described in detail in U.S. Pat. No. 3,916,048 to Walles which is hereby incorporated by reference. For the purposes of this invention, a barrier polymer is a film of polymer exhibiting a permeability to nitrogen of less than 2.5 cubic centimeters per square meter of film per day for a film 1 millimeter thick at a pressure difference of 1 atmosphere. Suitable barrier polymers are those normally solid organic polymers, which when in latex form will form a continuous film at temperatures below the heat distortion part of the organic polymer of the plastic substrate which forms the edge of the panel. As used herein, the heat distortion point of a polymer is that temperature at which an article fabricated of the polymer distorts as a result of minimal outside force. Exemplary barrier polymers include polymers of vinylidene chloride containing at least 50 weight percent, preferably at least 70 weight percent, of vinylidene chloride and a remaining amount of a copolymerizable ethylenically unsaturated comonomer. Of particular interest are vinylidene chloride/vinyl chloride copolymers, vinylidene chloride/acrylonitrile copolymers and the like, especially those described in U.S. Pat. No. 3,617,368 to Gibbs et al.

The barrier polymer is applied in latex form to the exposed surface of the metal layer, to form a coating of about 0.25 to about 50 82 m in thickness, preferably from 2.5 to about 12.5 $\mu$m thick. The coating of barrier polymer covers at least 95 percent, preferably at least 99 percent of the exposed surface of the metal layer.

Most preferably, the plastic edges are rendered essentially impermeable to gases by depositing thereon successive layers of barrier polymer, metal and barrier polymer, such as is described in the pending application filed by Walles on even date herewith, entitled "Metallized Plastic Articles." In this process, a surface of the plastic edge is rendered water-wettable by contacting the surface with dry air containing approximately 2 percent sulfur trioxide. The surface sulfonated edge is then coated with a layer of barrier polymer by applying an aqueous colloidal dispersion and drying said dispersion to a continuous film having a coating weight from about 5 to 12,000 micrograms per square centimeter ($\mu$g/cm$^2$). The coated surface of the film is surface sulfonated in the same manner as was the plastic edges, and the sulfonated surface is metallized by depositing thereon a coating of a metal such as silver, lead, nickel, aluminum, copper, gold, titanium, tin, bismuth, antimony, chromium, manganese and the like including alloys thereof using the metallization techniques described hereinabove. The metal coating thus deposited is about 0.005 to 5 $\mu$m in thickness. The metallized edge is then overcoated with a layer of a barrier polymer by applying an aqueous colloidal dispersion and drying said dispersion to a continuous film. Additional alternating layers of metal and barrier polymer can be applied in like manner to further improve the barrier characteristics of the plastic edge.

The layers of barrier polymer and metal may reside on the surface of the plastic edge which is most proximate to the evacuated space, or on that surface of the plastic edge which faces the exterior of the assembled panel. However, even under normal conditions of use, the exterior of the panel is subjected to scratches, cuts and other small deformities which significantly reduce the barrier properties imparted by the barrier polymer and metal layers. For this reason, it is preferred that the layer of barrier polymer and the layer of metal are on the surface of the plastic edge most proximate to the evacuated space.

The plastic edges are affixed to the panel walls with an adhesive which adheres to both the plastic edges and the panel walls and dries or cures to form a strong continuous bond between the edges and the walls with no gaps, holes or holidays. Suitable adhesives include, but are not limited to, epoxy resins and polyurethane adhesives. The individual plastic edges are joined at their ends with an adhesive such as epoxy resin, or preferably by ultrasonic welding, in order to form an enclosed panel without leaks. Advantageously, the plastic edges are premolded or preshaped as a unit which may be affixed directly to the panel walls with no further adjoining of the edges. The assembled panel encloses a space which can be evacuated until the pressure inside the panel is about $10^{-6}$ atmospheres without leaking gas through the adhesive bonds or plastic welds.

A gas-absorbing material is added to the enclosed space prior to or after vacuumization of the space, preferably after evacuation. Usually, the gas-absorbing material is a finely divided solid or mixture of finely divided solids such as carbon black and activated charcoal powder, diatomaceous earth and other carbonaceous powders resulting from pyrolysis and/or steam activation of organic materials such as coconuts, corn husks, sugar; powdered metals and metal oxides and hydroxides, e.g., barium, lithium, sodium hydroxide, calcium oxide; metal silicates, calcium silicate, magnesium silicate, and finely divided, high surface area silicas such as fumed silica. Generally, porous powders of gas-absorbing solids having an average surface area of 100–2000 square meters per gram are desirable. Most advantageously, the powder has an average particle size in the range from about $10^{-2}$ to about 10 microns.

The gas-absorbing material is preferably outgassed prior to filling the panel. Outgassing is achieved by heating the material to 300°–350° C. under a vacuum of $10^{-2}$ to $10^{-5}$ mm Hg in an oven or autoclave for about 12 to 48 hours prior to filling the vacuum panel. The amount of powder employed usually ranges from very small quantities such as about 0.3 gram up to large quantities which substantially fill the volume of the enclosed space. In fact, it is desirable to overfill the enclosed space with the material with mechanical overpressure during the filling operation. Such overfilling enables the gas-absorbing material to add to the overall structural strength of the panel. In addition, the gas-absorbing materials employed in this invention are themselves good insulators, thereby rendering the filled panel effective as a thermal insulating panel at significantly lower internal vacuum than unfilled or partially-filled panels. After overfilling, the walls of the panel bulge at the center until atmospheric pressure is applied to the exterior surfaces thereof. The presence of such quantities of the gas-absorbing material prevents the walls of the panel from bowing inward as a result of the air pressure differential caused by the enclosed evacuated space. It is understood that the gas-absorbing solids of the aforementioned types capture atmospheric gases by both physical absorption and chemical absorption mechanisms.

The space enclosed within the panel is evacuated by any conventional vacuum pump such as one of the type used in evacuating conventional vacuum-insulated panels. A preferred process for evacuating the enclosed space and filling the panel with powder is described in U.S. Pat. No. 3,824,762 to Walles. Most preferably, the filling operation is conducted in a partially evacuated chamber to overfill the enclosed space.

Alternatively, the enclosed space is evacuated by purging the space with a reactive gas and adding a material which will react with and absorb the gas, such as is disclosed in U.S. Pat. No. 3,921,844 to Walles. Materials and gases employed in this manner are those which react and eliminate gas from the system or which generate a product or products which can be absorbed by another gas-absorbing material such as activated carbon.

Carbon dioxide is readily absorbed in this manner by mixtures of activated carbon and lithium alkoxides such as lithium isopropoxide. Lithium isopropoxide reacts with carbon dioxide to liberate diisopropyl ether which is strongly absorbed by activated carbon. Although carbon dioxide is also absorbed by the activated carbon, it slowly desorbs, reenters the gas phase and is subsequently converted to lithium carbonate and diisopropyl ether. Lithium alkoxides having 2 or more, preferably 3–10 carbon atoms are particularly effective for this purpose. Alkoxides of other alkali metals or alkaline earth metals are similarly effective, especially if a mild vacuum of 0.1 to 0.01 atmosphere is used during the filling and closing of the panel.

After the panel is filled with the gas-absorbing material and evacuated, the opening or openings through which the material is added and the vacuum drawn are hermetically sealed such that a vacuum is retained. Said openings can be in the panel walls or the plastic edges, with openings in the panel wall being preferred. Conventional techniques for sealing vacuum containers can be adapted to seal the panel. Preferably, the seal is made in a recessed area of the wall or edge, so that little or no part of the seal protrudes from the panel. If the opening to be sealed is in the plastic edge of the panel, a preferred means of sealing the opening is by inserting into the edge a plug of plastic material similar to or at least fusable with the plastic material of the edge and rotating said plug until friction between the plug and the surfaces proximate to the opening fuses the plug to the boundary wall and thereby forms a hermetic seal. The plug is advantageously treated in the same manner as the plastic edges in order to render it substantially impermeable to gases.

Surprisingly, panels according to this invention which are properly constructed often exhibit a permeance to oxygen less than 0.1 cubic centimeters per day per square meter of panel area per atmosphere (cc/day/m$^2$/atm); preferably less than about 0.06 cc/day/m$^2$/atm.

The following examples are given to illustrate the invention and should not be construed as limiting its scope. All parts and percentages are by weight unless otherwise indicated.

EXAMPLE 1

A panel is constructed having walls of 300 mm×300 mm sheets of a laminated material having layers of steel, 0.15 mm, high density polyethylene, 0.5 mm and steel, 0.15 mm.

Four edges measuring about 300 mm×25 mm×2 mm are molded from an acrylonitrile/butadiene/styrene copolymer. One surface of each edge is surface sulfonated to a degree of about 0.2 micrograms of sulfur trioxide equivalents per square centimeter by contacting the surface with dry air containing 2 percent by volume sulfur trioxide at 25° C. for approximately 1 second.

The surface sulfonated edges are coated with a vinylidene chloride polymer by applying a 35 percent solid aqueous colloidal dispersion having an average particle size of 0.22 micron using a Meyer rod. Excess amounts of the dispersion are allowed to drain off and the remaining dispersion is dried to a film having a thickness of 10 $\mu$m.

The coated surface of the edges are surface sulfonated to a degree of about 0.2 microgram of sulfur trioxide equivalents per square centimeter by contacting the surface with dry air containing 2 percent sulfur trioxide at 25° C. for approximately 1 second.

A metallizing bath is prepared by melting one part each of the following solution:
0.6 percent $Ag(NH_3)_2NO_3$ in $H_2O$
0.3 percent NaOH in $H_2O$
0.15 percent glucose and 0.15 percent fructose in $H_2O$.

The surface sulfonated edges are dipped into the bath and metallization is completed within 1 minute. The metallized edges are removed from the bath and washed with water. The thickness of the metal layers thus deposited is 0.31 $\mu$m as determined by microscopy.

The metallized edges are overcoated using the polymer and techniques employed in coating the plastic substrate. The latex is dried to a film having a thickness of 6 $\mu$m.

The panel is assembled using as an adhesive a commercially available vacuum quality epoxy resin. In the space enclosed by the panel is placed a metal grid which provides internal structural support in order to permit testing of the panel under vacuum.

The panel is connected via a tube to a vacuum pump and evacuated to a high vacuum of $10^{-3}$ mm Hg. The evacuated panel is then connected to a mass spectrometer and tested for $O_2$ permeance. After 3 days testing, measured $O_2$ permeance is less than 0.024 cc/day/m$^2$/atm.

EXAMPLE 2

A panel is contructed having walls and edges as described in Example 1, using an epoxy resin as the adhesive but employing no metal grid in the enclosed space between the walls. Instead, the panel is placed into a chamber evacuated to a pressure of $10^{-3}$ mm Hg and the space between the panel walls is filled with an activated carbon powder having a number average particle size of $10^{-2}$ $\mu$m. The activated carbon powder is previously outgassed by heating in an oven at about 350° C. for 24 hours at a pressure of $10^{-3}$ mm Hg. Filling is performed using a screwfeeder so as to overfill the panel. The panel is evacuated to a pressure of $10^{-3}$ mm Hg and sealed.

The filled and evacuated panel is tested for heat insulation properties. The thermal conductivity (k value) of the panel is determined to be less than 0.007 watts per square meter of panel per Celsius degree difference in temperature applied to the opposing walls of the panel per meter of panel thickness (W/m-°C.). By contrast, the k values of polystyrene foam and polyurethane foam are 0.03-0.04 W/m-°C. and 0.016-0.025 W/m-°C. respectively.* The panel of the present invention, therefore, is shown to have significantly improved heat insulation properties as compared to polystyrene or polyurethane foam.

*The k values for polystyrene and polyurethane foams are calculated from values expressed in English units reported in *Modern Plastics Encyclopedia*, 1978-1979, Vol. 55, No. 10A.

What is claimed is:

1. A thermal insulating panel having double wall construction exhibiting a permeance to oxygen of about no more than 0.1 cc per day per m$^2$ of surface area per atmosphere, said panel comprising:
   (a) two walls of a structurally stable material containing at least one metal layer of at least 0.125 mm in thickness;
   (b) edges of a normally solid plastic material which have been rendered substantially impermeable to gases, said edges being affixed by means of an adhesive layer to the walls such that an evacuated space is enclosed between the walls of the panel, and
   (c) a gas-absorbing material residing in the evacuated space.

2. The panel of claim 1 wherein the evacuated space is filled with gas-absorbing material.

3. The panel of claim 1 wherein the metal-containing material is steel.

4. The panel of claim 1 wherein the metal-containing material is a metal/plastic/metal laminate.

5. The panel of claim 1 wherein the edges are rendered essentially impermeable to gases by a method which comprises applying to at least one surface thereof a layer of a barrier polymer and overcoating said layer of barrier polymer with an adherent layer of metal.

6. The panel of claim 5 wherein the metal layer is overcoated with a layer of a barrier polymer adherent to the metal layer.

7. The panel of claim 5 wherein the barrier polymer is overcoated with an adherent layer of silver.

8. The panel of claim 5 wherein the barrier polymer is a vinylidene chloride copolymer.

9. The panel of claim 1 wherein the edges are rendered essentially impermeable to gases by a method which comprises applying to at least one surface thereof a layer of metal and overcoating said metal layer with a layer of a barrier polymer.

10. The panel of claim 1 wherein the gas-absorbing material comprises activated charcoal in the form of a particulate solid.

11. The panel of claim 1 wherein at least a portion of the gas-absorbing material is an alkali metal alkoxide having from 2 to 12 carbon atoms.

12. The panel of claim 1 wherein the gas-absorbing material is fumed silica in the form of a particulate solid.

13. The panel of claim 1 which exhibits a permeance to oxygen of less than 0.06 cc/day/m$^2$/atm.

* * * * *